United States Patent [19]  [11] 3,942,281
Hill  [45] Mar. 9, 1976

[54] FISHING LURE
[76] Inventor: Richard L. Hill, 11140 E. Imperial Highway, Norwalk, Calif. 90650
[22] Filed: Feb. 19, 1974
[21] Appl. No.: 443,448

[52] U.S. Cl. ............. 43/42.39; 43/42.15; 43/42.28; 43/42.48; 43/42.53
[51] Int. Cl.² ........................................ A01K 85/00
[58] Field of Search ............. 43/42.39, 42.48, 42.53

[56] References Cited
UNITED STATES PATENTS
2,938,293  5/1960  Richardson .................... 43/42.48 X
3,638,347  2/1972  Kochevar .......................... 43/42.39

Primary Examiner—Hugh R. Chamblee
Assistant Examiner—Daniel J. Leach
Attorney, Agent, or Firm—Knobbe, Martens, Olson, Hubbard & Bear

[57] ABSTRACT

A streamline-configured fishing lure is molded of plastic with a uniformly distributed intermixture of granular weighting material, such as limestone, in a proportion to impart to the lure a specific gravity and in consequence thereof motions in water comparable with the specific gravity and motions of lures, formerly plentifully available but generally no longer available, that were carved from natural substances such as bone, ivory and horn. A leader for this or any type of lure, whether for casting, trolling or jigging, comprises a barbed hook arranged to have the free end of its shank coupled to a line and the opposite end of the shank coupled to the lure, the shank having flexible feathers secured thereto to form a shroud surrounding the hook.

4 Claims, 6 Drawing Figures

U.S. Patent    March 9, 1976    3,942,281
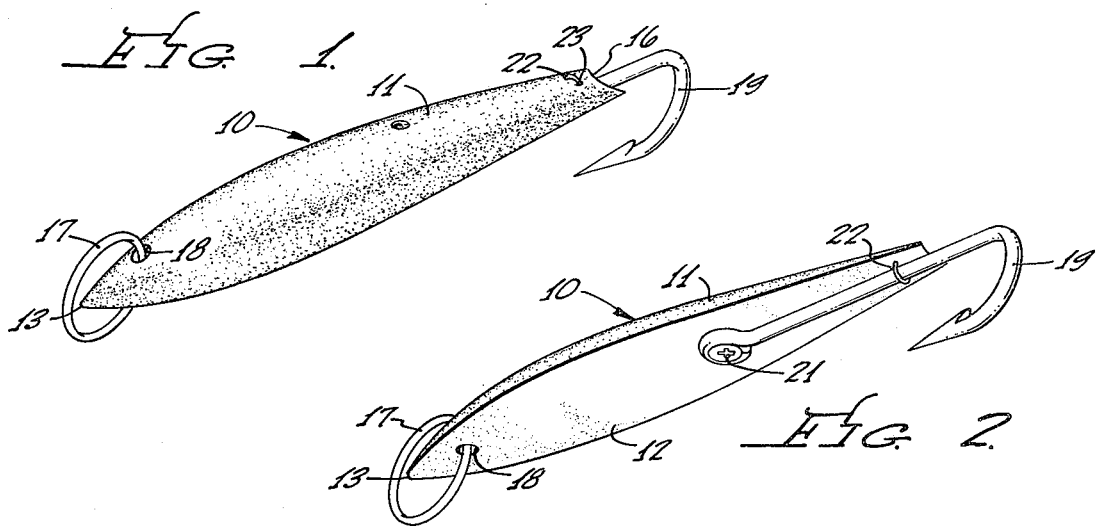
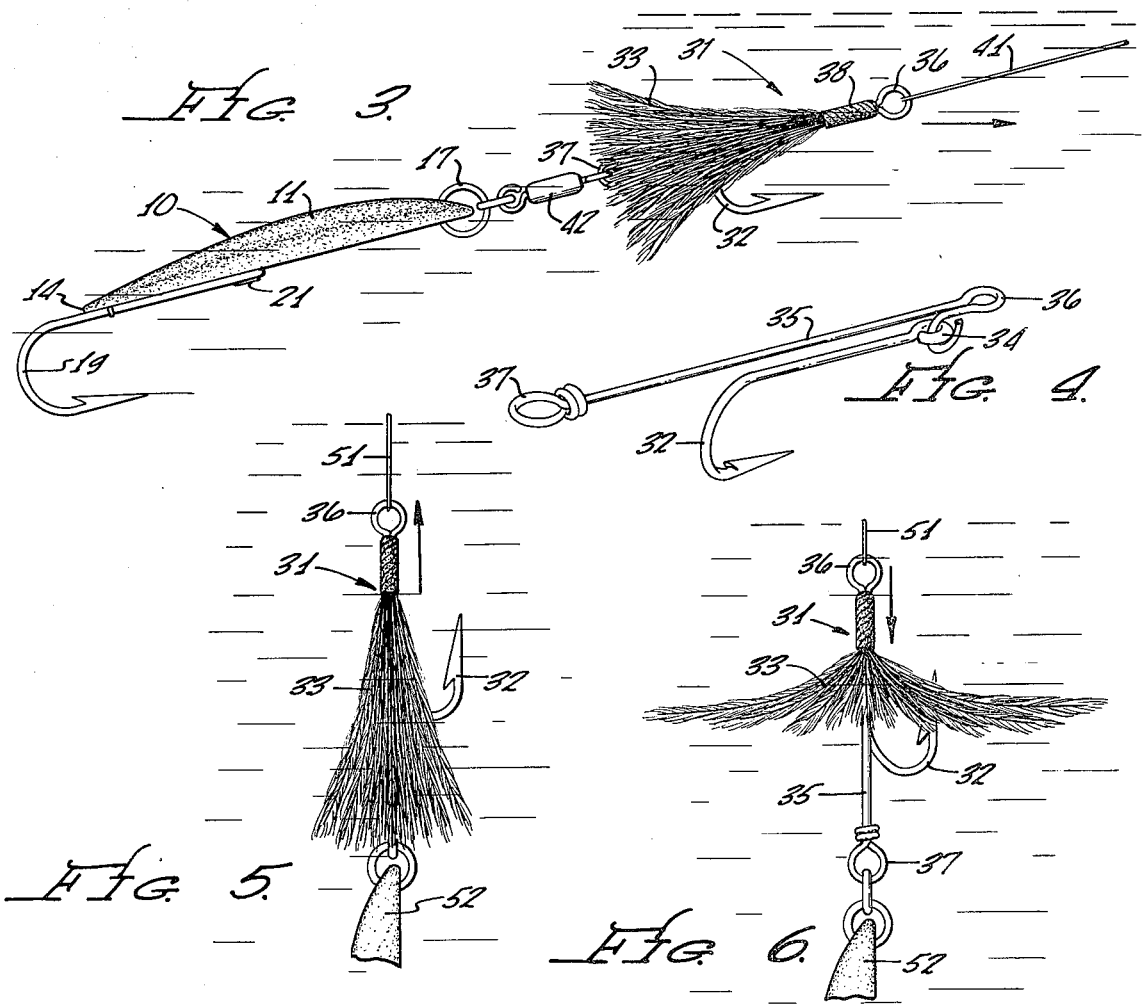

FISHING LURE

BACKGROUND OF THE INVENTION

Until the occurrence of World War II, generally in the period 1940 to 1945 there had been plentifully available to fishermen, both commercial fishermen and sports fishermen, a type of lure the body of which was carved from natural materials such as bone, ivory and horn. The principal source of these lures was the Orient, particularly Japan. The lures were used mainly for trolling and they were well adapted to this type of underwater activity because the specified natural substances have specific gravities falling in the range between values 1.4 and 2.1.

Typically, these carved lures had a flat surface and a rounded surface, providing cross-sectional contours resembling a bow or, more exactly, an arc subtended by a chord, with maximum width and thickness located about one third of the distance from the leading end of the lure. From that point forward they tapered in width and in thickness along curves to an approximation of a point at the tip. In the opposite direction they tapered in width and in thickness along gentler curves to a somewhat blunt trailing end. One or more barbed hooks were attached to their undersurfaces to extend beyond their blunt trailing ends, and at their leading ends they were provided with means such as rings for connection of the lures to lines. They were characterized by a high degree of success in attracting fish.

Since the close of that war, lures of this type have virtually disappeared from the market. Among reasons suggested for the disappearance of these lures from the market are that the carving of such lures has become a lost art, and/or adverse economics of the product. The net result is that a useful tool is no longer available to the fisherman.

Efforts to fabricate, in other ways than by carving, lures having attributes matching those of the carved bone, ivory and horn lures have heretofore been unsuccessful. One of these efforts resulted in the production of lures molded from plastics and consisting solely of the plastics. These lures had specific gravities in the immediate vicinity of unity and therefore were considerably lighter, in terms of unit of weight per unit of volume than the carved lures and therefore did not readily submerge nor remain submerged nor execute movements when drawn through water comparable with those of the lures made from the aforementioned natural substances. In order to increase the specific gravity of the plastic lures, weighting components were added such as, for example, plates of metal attached to the flat underside of the lure or pieces of metal embedded in the plastic lure. These added metal objects achieved specific gravities of the weighted lures comparable with those of the lures carved from natural products but their motions in the water were not comparable with those of the carved lures and they have been unsuccessful as devices for catching fish.

Still another approach to a substitute for the carved bone or ivory lures was the casting of lure bodies from metal alloys. It was found to be impossible to achieve specific gravities as low as the range of values for the bone, horn and ivory lures, and because of the higher specific gravities the metal alloy lures behaved differently in the water than did the carved lures and failed to attract fish to any extent comparable with that of the carved lures.

SUMMARY OF THE INVENTION

After experimentation with carved lures as produced in the earlier times when they were readily available, and experimentation also with lures weighted by means of metal components as hereinbefore set forth, I came to recognize that a fundamental difference between the weighted plastic lures and the natural bone lures lay in the fact that the composition of the bone, ivory and horn lure bodies was homogenous throughout, with any fractional component thereof, regardless of where located in the body, having the same specific gravity as any other fractional component of the body having the same volume. Stated another way, there was no significant variation in substance throughout any one lure body. To achieve this condition of homogeneity and thereby to produce a lure having all of the advantageous attributes of the carved lures, I have produced a lure which may have any specific gravity within the hereinbefore specified range of 1.4 to 2.1 by molding the lure from a mixture of moldable plastic, such as polyester resin or epoxy resin, and a granular filler, preferably of a mineral substance such as ground or pulverized limestone, with the filler so completely intermixed with the plastic that it is uniformly distributed throughout the cast lure and therefore achieves that uniformity of substance throughout the lure body that is characteristic of the lures carved from bone, ivory and horn. Actual usage of lures having filled plastic bodies produced in this manner, upon a comparative basis with carved bone lures, has resulted in the finding that the motions of the lures embodying my invention under trolling conditions are comparable with those of the carved bone lures and has further revealed that they are the equal in fish attracting properties of the carved bone lures.

In the course of my experimentation with the filled plastic lures in accordance with my invention, I found that on some occasion there was a tendency for the lure to rotate about its own center line and thereby twist the line by which it was being trolled. The addition of a simple swivel in the coupling of the lure to the line did not appear to significantly overcome this tendency. It has been overcome, however, by the provision of a leader between the line and the plastic lure which comprises a barbed hook that may be comparable in size with the hook or hooks associated with the plastic lure, the hook which is a part of the leader having attached to its shank a plurality of feathers completely encircling the hook and forming a shroud around the barbed portion thereof, the shank of the hook having associated with it a swivel, and serving, with the swivel as the interconnection between a line and the plastic lure. The leader has been found to overcome the tendency of the plastic lure to twist the line and has also been found to attract and catch fish upon its hook.

DESCRIPTION OF THE DRAWINGS

For a complete understanding of the invention, reference may be had to the following detailed description to be interpreted in the light of the accompanying drawings wherein:

FIG. 1 is a perspective view of a plastic lure in accordance with the invention, viewing the lure from above;

FIG. 2 is a perspective view of the same lure viewing it from its underside;

FIG. 3 is an elevational view of the lure shown in FIGS. 1 and 2, and a feather enshrouded hook forming a leader connecting the lure to a line;

FIG. 4 is an elevational view showing the skeletal components of the leader;

FIG. 5 is an elevational view showing the attitude of the feathers of the leader when the leader is moved forwardly through water by the line; and FIG. 6 is an elevational view showing the attitude of the feathers of the leader when drawn through water in the opposite direction, as by means of a lure or other object having a specific gravity significantly greater than 1.

DETAILED DESCRIPTION

Referring now to the drawings and particularly to FIGS. 1 and 2, the reference numeral 10 designates the body of a lure in accordance with the present invention. As set forth hereinbefore, the geometry of the lure body, its configuration, is substantially identical with that of lures generally no longer available that were carved from bone, ivory or horn. It has two surfaces, one curved and one flat, the upper or top surface 11 being curved and the lower or bottom surface 12 being flat. It has no sides which may be designated as such because the curved upper surface and the flat lower surface intersect in a plane which is the plane of the lower surface 12. The body 10 of the lure may be described as having a streamlined configuration. Its point of maximum width and maximum thickness is about one third of the length of the lure from the tip of the leading end thereof, and from that point forward the upper surface 11 curves smoothly downwardly and the edges of the flat surface 12 curve smoothly inwardly toward the center line of the body 10 to form a rounded nose 13 which may be a sharp point, or a blunt point.

From the point of maximum width and thickness the lure body 11 diminishes in thickness along a continuous convex curve or convex curve merging into a straight line and the width diminishes uniformly and symmetrically about the center line of the body either in a continuous long gentle convex curve from the point of maximum width of the undersurface 12 or curving inwardly a part of the distance toward the trailing edge of the body and merging into straight lines. In the case of the carved bone lure bodies it was customary to terminate the body of the lure at the trailing end short of intersection of the two edges of the lower surface 12 and short of actual intersection of the curved upper surface 11 with the flat lower surface 12, so that there was provided at the trailing end of the lure body a narrow end surface, and the preferred embodiment of the invention has such a narrow end surface, designated in FIG. 3 by the reference numeral 14. It was a general custom to notch the end surface and the trailing end surface 14 has such a notch, as indicated by the reference numeral 16 in FIG. 1. The lure body 10 is provided with means such as a closed ring 17 extending through an aperture 18 a short distance behind the tip 13 of the lure body for coupling the lure to a line or to a leader. A barbed hook 19 is attached to the lower surface 12 of the lure body 10 by any desired means such as a threaded fastener 21 and the shank of the hook 19 is confined to a position extending longitudinally of the lure by clamping means such as a wire clamp 22 extending through apertures 23 in the body of the lure near the trailing end thereof. The clamping wire 22 may, if desired, be a U-shaped loop of wire with its free ends twisted together and bent to lie flat against the upper side 11 of the lure 10.

There remains for consideration the composition of the lure body and it is the primary intent of the invention that its specific gravity shall lie within the range of specific gravities of natural materials from which lure bodies were formerly carved, namely bone, horn and ivory, these materials generally falling within the specific gravity range 1.4 to 2.1, as hereinbefore set forth. Equally important intentions of the invention are that the substance from which the lure body is to be made shall be readily moldable and that the resulting lure body shall be resistant to fracture, tough so as to be resistant to indentation, such as by the teeth of captured fish, and generally durable. The desired objectives have been achieved by using moldable plastics such as polyester resin or epoxy resin, which may be molded or cast in accordance with conventional and well known plastic molding practices. These may include resins and other plastics that are settable solely by the action of activated or curing additives, or they may be thermosetting plastics.

Generally the resins and other plastics themselves have specific gravities below the range desired as hereinbefore specified. Specific gravities within the desired range may be achieved by the addition to the plastics, prior to curing, of filler or weighting materials, preferably inert, by which is meant having no tendency to react chemically with the resins or other plastics, and in granular or pulverized form so that they may be distributed throughout the plastic in a uniform intermixture, to achieve a homogenous intermixture and a uniform distribution of weight per unit of volume throughout the bodies cast from the material. Limestone is an example of a weighting material that has been found to be suitable for this purpose. If desired, pigments may be added to the intermixture of plastic and filler to impart color as desired to the lures. In addition, if there is found to be any tendency for fracturing or other breakage of lures produced from the aforementioned combinations of components under ordinary conditions of handling, and using, the lures may be reinforced by the inclusion in the mixture of moldable components, prior to the molding of the lure bodies, of reinforcing materials such as strands or other fragments of fiberglass. A fishing lure which has the general appearance and durability of bone and a density of about 1.8 can be made by mixing 8 parts by weight of finely crushed limestone into 6 parts by weight of Epon 812 epoxy resin, supplied by Shell Chemical Co., to obtain a uniform dispersion of limestone and hardening the resin as directed by the manufacturer.

Lures having the configuration and composition hereinbefore described, in order to achieve equivalency with lures carved from natural substances such as bone, horn or ivory, have been found by actual usage in salt water and fresh water fishing, to behave in the water under trolling conditions in the same fashion as the carved lures and have been found to be as effective as the carved lures in attracting and catching fish.

It has sometimes occurred in the use of lures of the type hereinbefore described connected by means of the coupling ring herein disclosed directly at the end of a line, or even if a swivel is included between the end of the line and the lure, that the lure may tend to revolve as it is drawn through the water in the trolling operation and to transmit this rotation to the line, even when connection of the lure to the line is made through a swivel. The result is that the line becomes twisted, which is an undesirable condition when the line which has been drawing a lure through the water is rewound upon the reel of the fishing equipment. The reason for this phenomenon is not generally comprehended but it is thought to be a function of trolling speeds, or a change in trolling speed or direction. This is not unique to plastic trolling lures of the type hereinbefore described because a similar tendency has sometimes been observed in the use of the carved lures. However, this tendency of trolled lures to twist the line has been overcome by the connection of the lure to the line through the intermediate agency of a leader now to be described.

Referring now to FIG. 3 the reference numeral 31 designates generally a leader, the principal components of which are a hook 32 similar to the hook 19, and a shroud of feathers 33 attached to the shank of the hook 32 and surrounding the hook. FIG. 4 is a view showing the leader 31 before the addition thereto of the feathers 33. The hook 32 is seen to be a conventional type of barbed hook with an eye 34 at the free end of its shank. Associated with the hook 32 is a hook extension member or shaft 35 which is provided at opposite ends with eyes 36 and 37 for connection of the shaft 35 to the line and to the lure respectively. The shaft 35 may be a wire rod with the eyes 36 and 37 formed at its opposite ends and it may pass through the eye 34 of the hook at the point of connection of the hook to the shaft 35.

Preferably the feathers are very flexible so that they will fan out surrounding the leader shaft 35 and hook 32 and they are applied to the shaft 35 and hook 32 by laying their central ribs or quill portions along the shaft 35 and hook 32 with their tips extending toward the trailing end of the leader 31 and with their natural curvature directed outwardly from the leader. They may be secured to the shaft 35 and hook 32, and the shank of the hook also held in engagement with the shaft 35, by means of a wrapping 38 of tape or cord. In use, the eye 36 is connected to the line 41 and the eye 37 is connected to one end of a swivel 42, the other end of which is connected to the ring 17 of the lure. With this leader connected between the line 41 and the lure 10 through the leader 31 and swivel 42 it has been found that there is no tendency whatsoever for a twist to be imparted to the line 41 by the lure 10 under any trolling conditions. The feathers 32 of the leader may serve to attract fish or whether the leader 31 or the lure 10 is the attracting object, the hook 32 is a means for catching and retaining a fish in addition to the hook 19.

In my U.S. Pat. No. 3,676,948 granted July 18, 1972 there is disclosed a type of fishing lure which is constructed of materials to impart a specific gravity in the range of 10.5 to 19.3 and the lure is intended primarily for fishing in accordance with a procedure called "jigging," which involves repetitious lifting and lowering of the line and attached lure at or in the vicinity of the bottom of the body of water at the point where the fishing is being done. Instead of connecting a lure of the type shown in that patent directly to the end of a line, a leader of the type disclosed herein may be connected between the end of the line and the lure advantageously. FIGS. 5 and 6 show a leader 31 connected to the end of a line 51 and with the opposite or trailing end of the leader 31 connected to a lure 52, shown in FIGS. 5 and 6 only as a fragment of a lure at the leading end thereof. In this type of fishing the line extends substantially vertically from the lure to the boat or other support from which the fishing is being done. FIGS. 5 and 6 show respectively the action of the feathers 33 under the conditions of upward and downward movement of lure and leader through the water. As indicated in FIGS. 5 and 6 upward motion of the leader through the water causes collapsing of the shroud of feathers inwardly toward the shank of the leader and downward movement of the lure and leader causes an outward expansion of the shroud of feathers with respect to the leader and hook. The motion of the feathers in changing from one to the other of the two conditions depicted in FIGS. 5 and 6, and particularly the change from the attitude shown in FIG. 5 to the attitude shown in FIG. 6 as the lure 52 begins a downward movement, may serve as a strong attraction for a nearby fish and thereby result in the catching of a fish on the hook 32 as well as the possibility of catching a fish on the hook (not shown) at the lower end of the lure 52. When the leader 31 is used in association with a lure of the type represented by the lure 52 in FIGS. 5 and 6 there is little if any need for a swivel between the leader and the lure, and none has been shown in the drawings although it will be understood that a swivel could be provided. It will also be apparent that the leader 31 could be used for bottom, or near-bottom fishing without a lure designated by the reference numeral 52, an adequate weight, commonly called by fishermen a sinker, being substituted for the lure.

What is claimed is:
1. A fishing lure comprising:
an elongate streamlined solid body molded of a large percentage of plastic and a large percentage of comminuted solid material intermixed with and uniformly distributed through the plastic in a proportion to impart to the body homogeneity and a specific gravity in the range of 1.4 to 2.1;
a facility for coupling the body to a line; and
at least one barbed hook attached to the body.
2. A fishing lure in accordance with claim 1 wherein: the plastic is a polyester resin.
3. A fishing lure in accordance with claim 1 wherein: the plastic is an epoxy resin.
4. A fishing lure in accordance with claim 1 wherein the comminuted solid material is a mineral substance, exemplified by limestone, generally in granular to pulverulent form.

* * * * *